(12) United States Patent
Wu et al.

(10) Patent No.: US 9,612,391 B2
(45) Date of Patent: Apr. 4, 2017

(54) CONNECTOR AND CONNECTOR ASSEMBLY

(71) Applicant: Tyco Electronics (Shanghai) Co. Ltd., Shanghai (CN)

(72) Inventors: Honghao Wu, Shanghai (CN); Marshall Chen, Shanghai (CN); Tim Xue, Shanghai (CN); Hongtao Liu, Shanghai (CN); Helena Sun, Shanghai (CN); Bing Liu, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 57 days.

(21) Appl. No.: 14/676,969

(22) Filed: Apr. 2, 2015

(65) Prior Publication Data
US 2015/0285986 A1    Oct. 8, 2015

(30) Foreign Application Priority Data

Apr. 4, 2014  (CN) .................... 2014 2 0165863 U (51) Int. Cl.
F21V 8/00    (2006.01)
H01R 13/717  (2006.01)
H01R 12/72   (2011.01)

(52) U.S. Cl.
CPC ....... *G02B 6/0075* (2013.01); *H01R 13/7172* (2013.01); *H01R 13/7175* (2013.01); *H01R 12/722* (2013.01)

(58) Field of Classification Search
CPC ............. G02B 6/0075; H01R 13/7172; H01R 13/7175; H01R 12/722

USPC .............. 362/551, 555, 581, 582, 602, 613; 439/490

See application file for complete search history.

(56) References Cited

U.S. PATENT DOCUMENTS

| | | | | |
|---|---|---|---|---|
| 5,876,239 A * | 3/1999 | Morin | .................. | H01R 13/717 439/490 |
| 5,885,100 A * | 3/1999 | Talend | ................. | G02B 6/4292 439/490 |
| 5,938,324 A * | 8/1999 | Salmon | .................. | B60Q 3/004 362/551 |
| 7,621,773 B2 * | 11/2009 | Bright | .................. | G02B 6/0008 439/490 |
| 8,335,416 B2 * | 12/2012 | Shirk | .................... | G02B 6/0008 385/146 |
| 8,534,892 B2 * | 9/2013 | Letourneau | .......... | G02B 6/0008 362/551 |
| 2007/0253168 A1 * | 11/2007 | Miller | .................. | G02B 6/4246 361/719 |

(Continued)

FOREIGN PATENT DOCUMENTS

CN    103065561 A       4/2013
WO    WO 00/22697   *   4/2000  ............... H01R 3/00

OTHER PUBLICATIONS

English Translation of CN103065561A, published Apr. 24, 2013, 8 pages.

*Primary Examiner* — Laura Tso
(74) *Attorney, Agent, or Firm* — Barley Snyder (57) ABSTRACT

A connector assembly is disclosed having a circuit board with a side edge; one or more light emitting devices connected to the side edge of the circuit; and a connector. The connector has a support frame, and one or more light guide assemblies positioned on the support frame adjacent to the side edge of the circuit board.

20 Claims, 5 Drawing Sheets

(56) References Cited

U.S. PATENT DOCUMENTS

2010/0182798 A1* 7/2010 Chen .................... G02B 6/0008
362/555

* cited by examiner

CONNECTOR AND CONNECTOR ASSEMBLY

CROSS-REFERENCE TO RELATED APPLICATIONS

This application claims the benefit of Chinese Patent Application No. 201420165863.X filed on Apr. 4, 2014 in the State Intellectual Property Office of China, the whole disclosure of which is incorporated herein by reference.

FIELD OF THE INVENTION

The invention is generally related to an electrical connector, and, more specifically, to an electrical connector assembly having a visual operating indicator.

BACKGROUND

An indicator light is often mounted in an electric apparatus such as an electrical connector to indicate an operating state of the electric apparatus. For example, a plurality of light emitting devices such as light emitting diodes (LEDs) may be mounted inside an electric apparatus, and a plurality of light transmitting tubes are mounted so that an input end of each light transmitting tube faces one light emitting device, and an output end thereof extends through a through hole in a panel at the front of the electric apparatus.

In this electric apparatus, a lighting state, such as lighting or dimming, or changing in lighting color, of each light emitting device may represent an operating state of some or several electrical devices in the electric apparatus. Light produced by each light emitting device is transmitted to the front of the panel through the corresponding light transmitting tube, thereby an operator can determine the operating state of the electrical device by observing a lighting condition at the output end of the light transmitting tube from the front of the panel.

Figure 1:
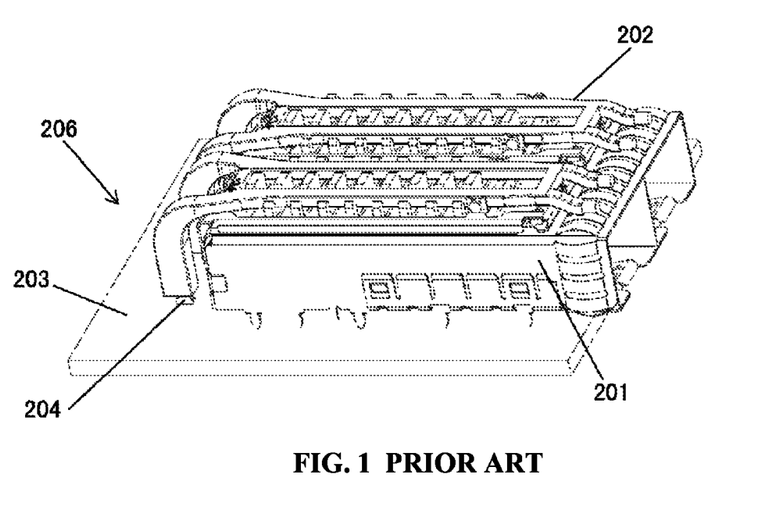
FIG. 1 is a perspective view of a conventional electrical connector assembly.

FIG. 1 is a perspective view of a conventional connector assembly 206 where an electrical connection device or optical fiber connection device (not shown) is mounted within a housing 201. The housing 201 has a light transmitting tube 202 made of a transparent light guide material, such as polycarbonate (PC) material, that transmits light from a LED signal lamp 204 positioned at a rear or middle position on a circuit board 203(for example, a PCB (print circuit board)) to the front of the connector. A user is then able to observe signal light from a light outlet in front of the light transmitting tube 202. The signal light represents an operating state of the connector.

The light transmitting tube 202 is positioned above the connector housing 201, and the signal lamp 204 is positioned behind the connector. When the connector has a double-layer housing, the light transmitting tube 202 is positioned within an interlayer, and the signal lamp is positioned behind the connector.

In addition to the light transmitting tube 202, the connector assembly 206 often includes a heat sink and clamps for fixing the heat sink. Airflow moving towards the heat sink of the connector may be partially disrupted by the light transmitting tube provided on the housing 201, resulting in a reduction in heat transfer efficiency of the heat sink. Further, airflow interference conditions may also be produced by a main body of light transmitting tube 202 and the clamps or other structures. In order to avoid these interference conditions, the light transmitting tube 202 is often formed with a plurality of curved parts that permit the airflow to move relatively undisturbed. However, such curves result a certain degree of light loss, thereby finally resulting in a reduction in light intensity at the light outlet. Such reduction in light intensity can adversely affect determination of the operating state of connector.

There is a need for an electrical connector assembly with visual operating indicators that do not disturb airflow to the heat sinks, and do not result in a reduction in light intensity at the light outlet.

SUMMARY

A connector assembly is disclosed having a circuit board with a side edge; one or more light emitting devices connected to the side edge of the circuit; and a connector. The connector has a support frame, and one or more light guide assemblies positioned on the support frame adjacent to the side edge of the circuit board.

BRIEF DESCRIPTION OF THE DRAWINGS

The invention will be described by way of example, with reference with the accompanying Figures, of which.

DETAILED DESCRIPTION OF THE EMBODIMENT(S)

Exemplary embodiments will be described hereinafter in detail with reference to the attached Figures, wherein the like reference numerals refer to the like elements. The disclosure may, however, be embodied in many different forms and should not be construed as being limited to the embodiments set forth herein. Rather, these embodiments are provided so that the disclosure will be thorough and complete, and will fully convey the concept of the disclosure to those skilled in the art.

Figure 2:
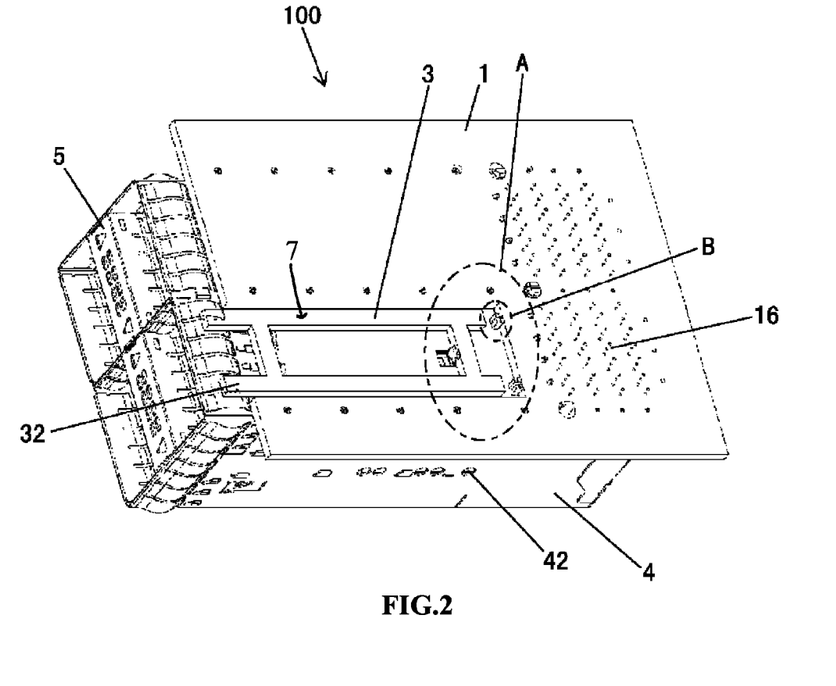
FIG. 2 is a perspective view of a connector.
Figure 3:
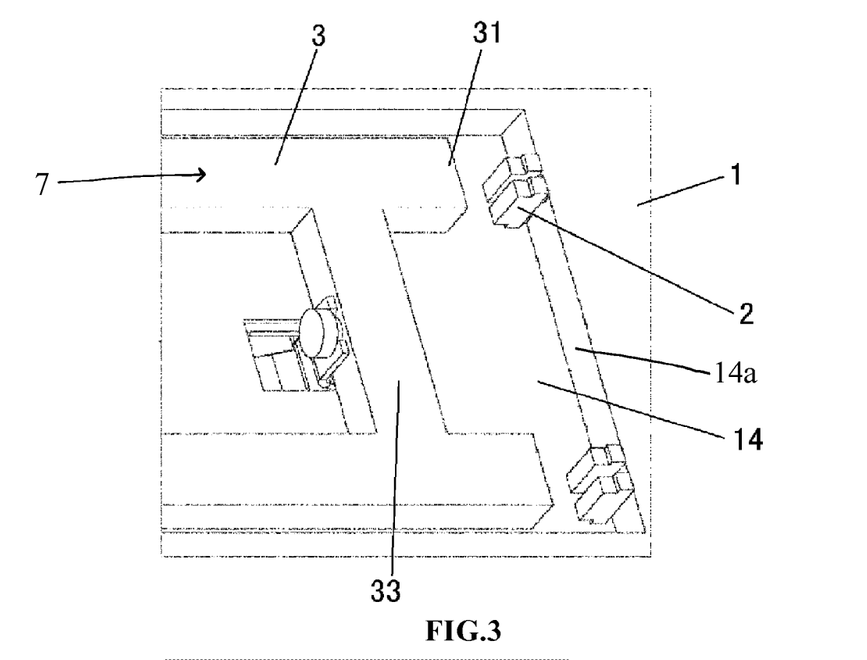
FIG. 3 is an enlarged perspective view of a part "A" shown in FIG. 2.

In the embodiments shown in FIGS. 2 and 3, the connector assembly 100 has a circuit board 1, at least one light guide assembly 7 positioned on a side edge of the circuit board 1 in parallel with a thickness direction thereof, and a connector. The connector may be an electrical connector, an optical fiber connector, a photoelectric conversion module, a photoelectric converter, or other similar connectors.

The connector is positioned on the circuit board 1, and at least one light emitting device 2 is positioned at the side edge of the circuit board 1 in parallel with the thickness direction thereof The connector has a support frame 4, and at least one light guide assembly 7, each being mounted on the support frame 4 adjacent to the side edge of the circuit board 1 and serving to guide light emitted by the light emitting device 2.

Figure 11:
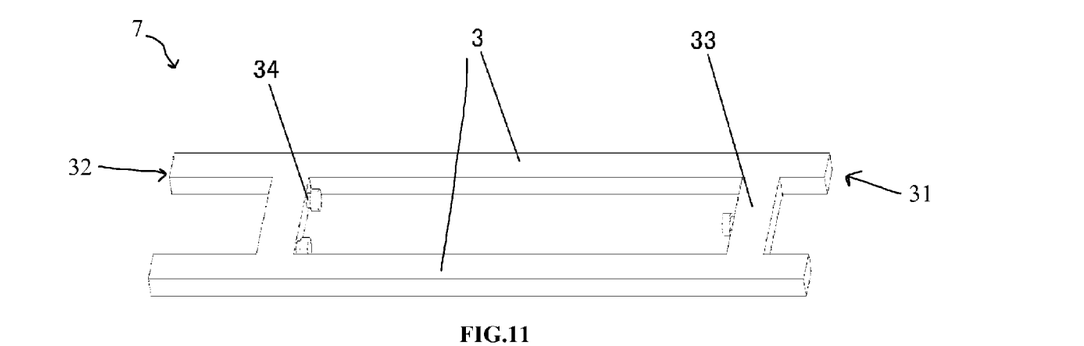
FIG. 11 is a perspective view of a light transmitting tube.

In the embodiments shown in FIGS. 3-9, the light guide assembly 7 is positioned near the side edge of the circuit board 1, such as a print circuit board, in parallel with the thickness direction thereof The light guide assembly 7 includes at least one light transmitting tube 3. (See also, FIG. 11) The circuit board 1 has at least one pair of conductive layers 11 exposed at the side edge of the circuit board 1. (See FIG. 8) Each light emitting device 2 is mounted to and electrically connected to a pair of the conductive layers 11. An input end 31 of each light transmitting tube 3 is mounted to face one light emitting device 2, thereby guiding light emitted by the light emitting device to an opposite output end 32. (See FIG. 3)

Figure 4:
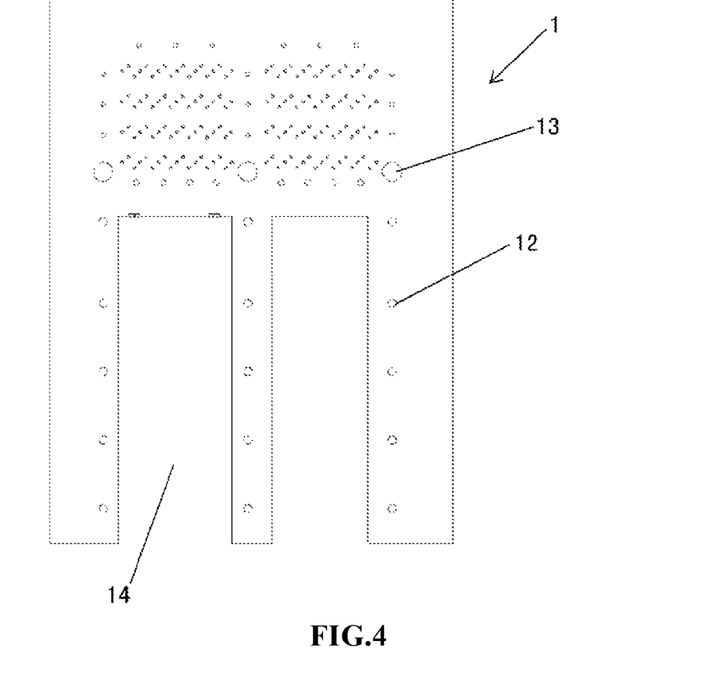
FIG. 4 is a plan view of a first circuit board.
Figure 5:
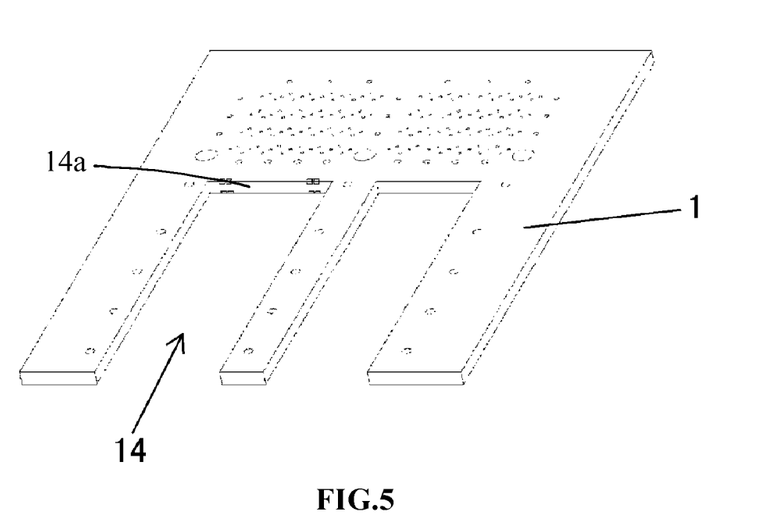
FIG. 5 is a perspective view of the first circuit board shown in FIG. 4.
Figure 6:
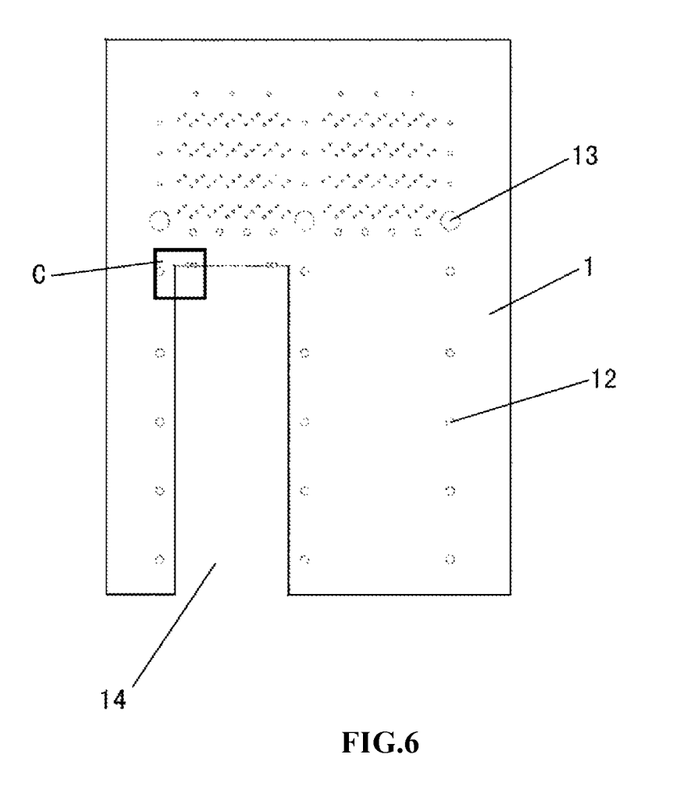
FIG. 6 is a plan view of a second circuit board.

In an embodiment shown in FIGS. 4 and 5, the circuit board 1 has one or more pin receiving holes 12, each being an approximately circular, for receiving a complimentary conductive pin of an electrical device, mounting holes 13 for connecting the circuit board 1 on the support frame 4, and a surface wiring region 16.

Figure 9:
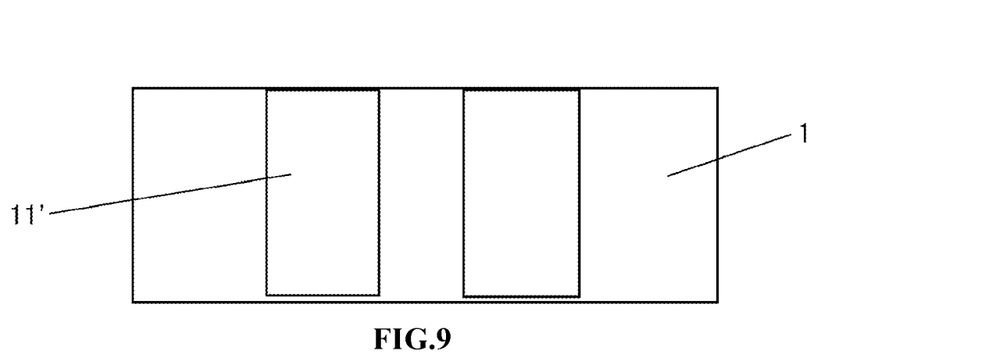
FIG. 9 is a sectional view of the second circuit board having conductive layers and weld layers.
Figure 10:
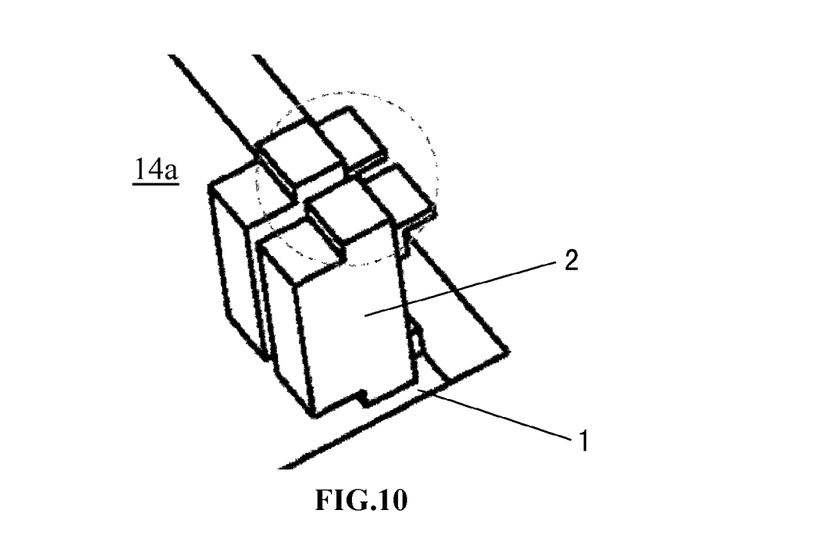
FIG. 10 is an enlarged perspective view of a part "B" shown in FIG. 3.

Further referring to the embodiments of FIGS. 2-4, the circuit board 1 has at least one notch 14, the light transmitting tube 3 being positioned within the notch 14 in parallel with a surface of the circuit board 1, as shown in FIG. 9, and with the conductive layers 11 being exposed on an inner side edge 14a of the notch 14. Generally, the notch 14 is formed within a blank region of the circuit board where no other electrical component is mounted and no conductive layer is provided inside the circuit board.

The notch 14 is positioned in a region of the circuit board 1 between the pin receiving holes 12, with the size of the notch 14 being equivalent to the size of the light transmitting tube 3. The light emitting device 2, such as a light emitting diode (LED) signal lamp, is mounted at the side edge of the circuit board 1 in parallel with the thickness direction thereof, so that light emitted by the light emitting device 2 passes linearly through the light transmitting tube 3, entering in the input end 31 and exiting the output end 32. Since the light transmitting tube 3 extends in linearly in a straight line parallel to a surface of the circuit board 1 and does not have any curved part, light will be transmitted linearly within the light transmitting tube 3 without any light loss in the transmission path, thereby improving the light guiding characteristic of the light transmitting tube 3 compared to the conventionally curved light transmitting tubes 202 in FIG. 1.

Figures 7, 8:
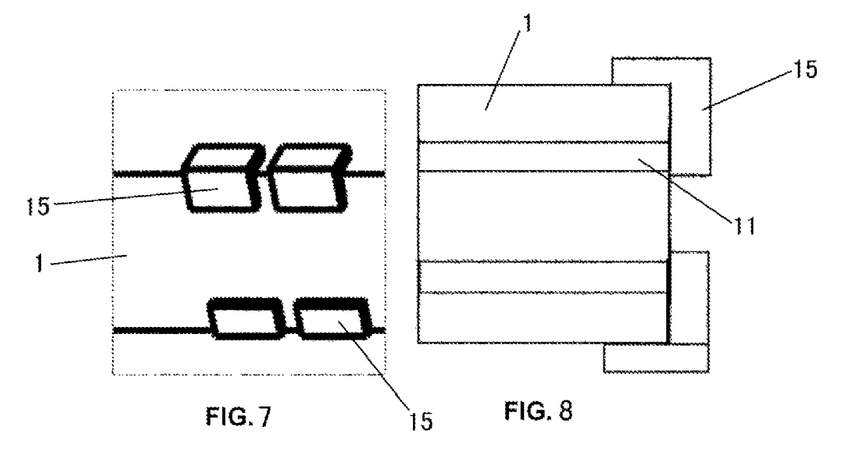
FIG. 7 is an enlarged view of a part "C" shown in FIG. 6.
FIG. 8 is a sectional view of the first circuit board having conductive layers and weld layers.

In the embodiments shown in FIGS. 7 and 8, a pair of conductive layers 11 are positioned as separate layers in the circuit board 1. The conductive layers 11 have conductive weld layers 15, to which the electrodes of light emitting device 2 (not shown) are welded. Electrical connection of the light emitting device 2 to the conductive layers 11 through the weld layers 15 can increase an area of a conductive region, and improve stability in mechanical and electrical connections between the light emitting device 2 and the conductive layers 1. Each pair of conductive layers 11 has a positive electrode conductive layer and a negative electrode conductive layer. (not labeled) The weld layer 15 is formed of a copper plating layer or other known suitable materials.

In an embodiment, the thickness of the circuit board 1 is generally equal to or larger than 2 mm, preferably 2.5 mm to 3.0 mm. The light emitting device 2, such as the light emitting diode, generally has a bottom surface with a length of 2.1 mm and a width of 0.6 mm. Pins (electrodes) of the light emitting diode 2 are soldered to the weld layers 15 on the PCB board. Since the light emitting diode 2 has a very light weight, a soldering connection can provide a holding force sufficient to ensure that the light emitting diode 2 will not fall off during various vibrations.

In the embodiments shown in FIGS. 7 and 8, the pair of conductive layers 11 are positioned in separate layers of the circuit board along the thickness direction, extending parallel to a plane of the circuit board 1. In another embodiment shown in FIG. 9, the conductive layers 11' may be positioned side by side in a width or length direction of the circuit board, that is, extend in parallel in the thickness direction of the circuit board perpendicular to the plane of the circuit board 1.

Figure 12:
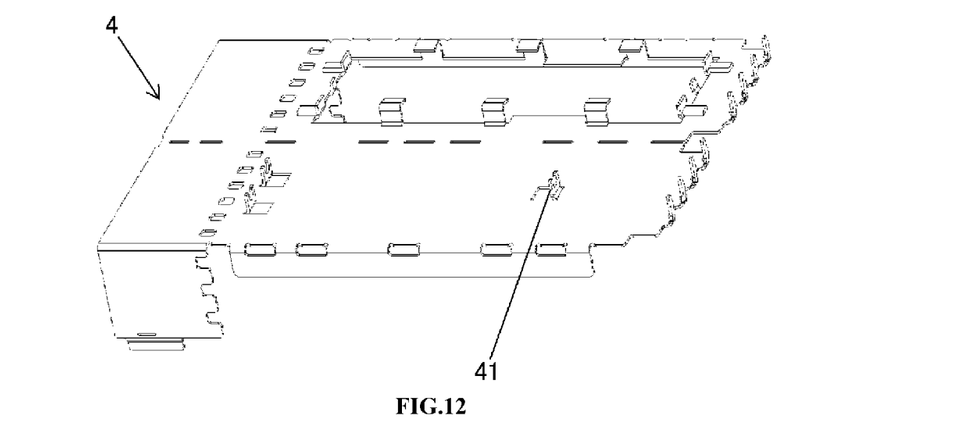
FIG. 12 is a perspective view of a support frame.

In the embodiments shown in FIGS. 2, 3, 11 and 12, the circuit board 1 is connected to outer surface of the support frame 4. Each light guide assembly 7 has two light transmitting tubes 3, and at least one connecting arm 33 is provided between the two light transmitting tubes 3. As shown in FIG. 12, the support frame 4 has at least one arm receiving member 41, through which the connecting arm 33 is mounted on the support frame 4. In an embodiment, the arm receiving member 41 is a clamp protruding outward from a surface of the support frame 4 towards the connecting arm 33. The connecting arm 33 has a complimentary protrusion 34 that is received in the arm receiving member 41 to snap fit with the clamp. The protrusion 34 includes a flange positioned on a terminating end opposite the connecting arm 33. As such, the arm receiving member 41 is clamps to the protrusion 34 between the flange and the connecting arm 33. The light transmitting tube 3 is prevented from moving in a fore and aft direction and a left and right direction, thereby the light guide assembly 7 and corresponding light transmitting tubes 3 are firmly mounted on the support frame 4.

In the electric apparatus shown in FIG. 2, the support frame 4 has a heat sink made of a heat dissipation material having a good heat dissipation performance. The heat sink includes a plurality of heat dissipating holes 42 disposed in the support frame 4. The light transmitting tube 3 extends within the notch 14 in parallel with the surface of the circuit board 1. The light transmitting tube 3 is positioned at the side edge of the circuit board in parallel with the thickness direction thereof, and will not block heat dissipating holes 42 formed in the support frame 4. Thus, airflow is not obstructed from entering the support frame 4, so the heat dissipation performance of the heat sink on the support frame 4 or the heat dissipation holes 42 in the support frame 4 is not degrade. Additionally, since the light transmitting tube 3 is positioned outside of the support frame 4, the heat dissipation holes 42 at the interlayer of the connector are not obstructed by the light transmitting tube 3, thus improving the heat dissipation performance of the double-layer connector compared to the conventional connector shown in FIG. 1. Compared to the conventional connector shown in FIG. 1, the heat dissipation performance can be improved by approximately 6.5%-12.46%, and temperature rise can be reduced by approximately 4.09° C.

In and embodiment of the electric apparatus shown in FIG. 2, the light transmitting tube 3 is a cylindrical structure extending linearly. The connecting arms 33 are positioned proximate to front and rear portions of the light transmitting tube 3. The connecting arm 33 has at least one protrusion 34 extending outward for snap fitting and stability. Therefore, the light guide characteristic of the light transmitting tube 3 is also improved over the conventional connector shown in FIG. 1.

Further, light shielding members (not labeled, see light transmitting tubes 3) may attached on two opposed side surfaces of the paired two light transmitting tubes 3. The light shielding members may be attached on the light transmitting tubes 3 by molding or by adhesive. The light shielding members block light transmitted within one of the two adjacent light transmitting tubes 3 from being irradiated into the other light transmitting tube 3, so that the lighting state of each light transmitting tub 3e will not be affected by other light transmitting tubes 3. Thus a user is able to clearly observe the operating state of the electric apparatus.

In an embodiment, the support frame 4 is a housing 4 for an electrical connector, and the lighting state of the light emitting device 2 is indicative of an electrical connection state between the electrical connector and a complimentary mating electrical connector (not shown). Referring to the embodiment shown in FIG. 2, the connector assembly 100 includes a panel 5 positioned on a mating end of the housing 4, with the light output end 32 of the light transmitting tube 3 being exposed from the mating end of the panel 5, The lighting condition of the light transmitting tube 3 can be observed by an operator viewing the mating end of the housing 4. The light output end 32 of the light transmitting tube 3 may be hidden behind or in the panel 5, the operator may observe the lighting condition at the output end 32 of the light transmitting tube 3 through a light outlet in the casing panel 5 on the mating end of the housing 4 and thereby determine the operating state of the electrical connector or circuit board 1.

The lighting state of each light emitting device 2 may represent the operating state of the electrical connector or the circuit board 1, such as a connection state between the electrical connector (for example, a socket connector) and a mating connector (for example, a complimentary plug connector), a connection state of some connection terminal, a connection state between the circuit board 1 and the electrical connector, or the like. Light produced by each light emitting device 2 is transmitted to the mating end of the connector through the corresponding light transmitting tube 3, thereby the operator can determine the operating state of the connector or circuit board by observing a lighting condition at the output end 32 of the light transmitting tube 3 from the mating end of the connector.

Those of ordinary skill in the art would appreciate that the housing 4 is not limited to that for the connector, instead, the housing may be a housing applicable for any electrical device such a CPU, a photoelectric conversion module, a switch circuit, a charging interface or the like in other embodiments.

In the connector and connector assembly 100 according to the above embodiments, the light guide assembly 7 is positioned near the side edge of the circuit board 1 in parallel with its thickness direction so as not to obstruct airflow from or to the upper heat sink. The heat dissipation performance of the heat sink can be reflected completely, and vents 42 in the interlayer of connector are not obstructed by the light transmitting tube 3, so that the heat dissipation performance of the double-layer heat sink is improved. Further, the light transmitting tube 3 is formed as a linear cylindrical structure without any corners, so that light transmitting characteristic of the light transmitting tube 3 is improved over the conventional, curved light transmitting tube shown in FIG. 1. Further still, the light transmitting tube 3 is directly fixed on the support frame 4 by a simple fixing structure without additional components.

Those of ordinary skill in the art would appreciate that the above embodiments are exemplary, and that various changes, modifications, or combinations may be made in these embodiments without departing from the principles and spirit of the disclosure, thereby achieving more kinds of the connectors and the connector assemblies while solving the problem.

It would also be appreciated by those of ordinary skill in the art that, upon describing embodiments in detail, various changes or modifications may be made in these embodiments without departing from the principles and spirit of the disclosure, the scope of which is defined in the claims and their equivalents, and that the present invention is not limited to the described and shown exemplary embodiments in the detailed description.

The wording "comprising," "having," or "including" does not exclude other elements or steps and the wording "a" or "an" does not exclude a plural number of an element.

What is claimed is:

1. A connector assembly comprising:
   a circuit board having a side edge;
   one or more light emitting devices connected to the side edge of the circuit; and
   a connector having
      a support frame, and
      one or more light guide assemblies positioned on the support frame adjacent to the side edge of the circuit board.

2. The connector assembly according to claim 1, wherein the circuit board has one or more pairs of conductive layers exposed along the side edge of the circuit board.

3. The connector assembly according to claim 2, wherein the light emitting device is positioned on the pair of conductive layers, and electrically connected thereto.

4. The connector assembly according to claim 3, wherein the light guide assembly has one or more light transmitting tubes.

5. The connector assembly according to claim 4, wherein each light transmitting tube has a light input end positioned to face one of light emitting device; and an opposite light output end.

6. The connector assembly according to claim 5, wherein the circuit board has at least one tube receiving notch.

7. The connector assembly according to claim 6, wherein the light transmitting tube is positioned in the notch and extends within the notch in parallel with a plane of the circuit board.

8. The connector assembly according to claim 7, wherein the conductive layers are exposed on a side edge of the notch.

9. The connector assembly according to claim 8, wherein the light transmitting tube extends linearly.

10. The connector assembly according to claim 3, wherein the paired conductive layers are positioned in separate layers within the circuit board.

11. The connector according to claim 3, wherein the light emitting device is electrically connected to the pair of conductive layers through a weld.

12. The connector assembly according to claim 4, wherein each the light guide assembly has two light transmitting tubes; and at least one connecting arm connected at two opposing ends to one of the light transmitting tubes and extending therebetween.

13. The connector assembly according to claim 12, wherein the support frame has one or more arm receiving members.

14. The connector assembly according to claim 13, wherein the connecting arm is connected to the support frame through the arm receiving member.

15. The connector assembly according to claim 14, wherein the connecting arm has one or more protrusions that snap fit into the arm receiving member to fix the light guide assembly to the support frame.

16. The connector assembly according to claim 15, wherein a terminating end of the protrusion is has a flange.

17. A connector assembly comprising a light guide assembly having:
   a linearly extending first light transmitting tube;
   a linearly extending second light transmitting tube extending parallel to the first light transmitting tube; and
   one or more connecting arms having a first end connected to the first light transmitting tube, and an opposite second end connected to the second light transmitting tube.

18. The connector assembly according to claim 17, wherein the first and second light transmitting tubes each have a light input end and an opposite light output end.

19. The connector assembly according to claim 17, wherein each connecting arm has a securing protrusion extending outward.

20. The connector assembly according to claim 19, wherein the securing protrusion has a terminating end with a flange radially extending outward therefrom.

* * * * *